(12) United States Patent
Moyer (10) Patent No.: US 11,388,994 B2
(45) Date of Patent: Jul. 19, 2022

(54) MODULAR STORAGE AND WORK STATION

(71) Applicant: HMC Holdings, LLC, Wampum, PA (US)

(72) Inventor: David A. Moyer, New Castle, PA (US)

(73) Assignee: HMC Holdings, LLC, Wampum, PA (US)

( * ) Notice: Subject to any disclaimer, the term of this patent is extended or adjusted under 35 U.S.C. 154(b) by 0 days.

(21) Appl. No.: 17/086,751

(22) Filed: Nov. 2, 2020

(65) Prior Publication Data
US 2022/0133034 A1 May 5, 2022

(51) Int. Cl.
*A47B 47/00* (2006.01)
*A47B 87/02* (2006.01)
*F16B 12/40* (2006.01)

(52) U.S. Cl.
CPC ...... *A47B 47/0008* (2013.01); *A47B 87/0215* (2013.01); *F16B 2012/403* (2013.01)

(58) Field of Classification Search
CPC ............. A47B 47/0008; A47B 87/0215; F16B 2012/403
See application file for complete search history.

(56) References Cited

U.S. PATENT DOCUMENTS

| | | |
|---|---|---|
| 1,340,562 A | 5/1920 | Sandmann |
| 2,912,294 A | 11/1959 | Wells |
| 3,107,131 A | 10/1963 | Lightbum |
| 3,272,582 A | 9/1966 | Mack |

(Continued)

FOREIGN PATENT DOCUMENTS

| | | |
|---|---|---|
| CN | 20353265 | 4/2014 |
| EP | 0191245 B1 | 4/1986 |

(Continued)

*Primary Examiner* — Matthew W Ing
(74) *Attorney, Agent, or Firm* — Vangelis Economou; Economou IP Law (57) ABSTRACT

A connector for connecting discrete modular storage units defined by plural hollow elongate support members having longitudinal ends including apertures into which vertical connection members can be inserted to connect adjacent modules. The inserts may be of a predetermined length to connect two horizontally adjacent modules or a length twice the predetermined length to connect two horizontally adjacent modules. For vertically and horizontally connected modules, the inventive connector may be utilized to connect modular shelving units having both an in-line and perpendicular configuration. The connector ideally comprises two identical insert members joined to each other in a desired orientation, so that the modules can be connected in different configurations, whether in-line, staggered or perpendicularly. The inventive connector also vertically connects the horizontally configured shelving modules to a variety of vertically disposed and configured shelving module units in a desired configuration. The connectors can be used to provide for an end connection at a top or bottom of the configuration in a dual insert connector, enabling a tab member to engage onto and retain an adjacent hollow tubular member or, in a single insert embodiment, to provide for insertion of a caster for resting on a floor.

10 Claims, 8 Drawing Sheets

(56) References Cited

U.S. PATENT DOCUMENTS

| | | |
|---|---|---|
| 3,465,898 A | 9/1969 | Klein |
| 3,636,893 A | 1/1972 | Lange |
| 3,786,765 A | 1/1974 | Burr |
| 4,223,585 A | 9/1980 | Barth et al. |
| 4,304,503 A | 12/1981 | Gehring et al. |
| 4,934,858 A | 6/1990 | Beaulieu |
| 5,048,995 A | 9/1991 | Beaulieu |
| 5,345,737 A | 9/1994 | Latchinian |
| 5,466,057 A | 11/1995 | Blankenburg |
| 5,715,760 A | 2/1998 | Frascaroli |
| 6,152,553 A | 11/2000 | Wunderlich |
| 6,626,605 B1 * | 9/2003 | Dean ................ F16B 7/0413 403/379.6 |
| 8,573,716 B2 | 11/2013 | Zalewski |
| 8,708,433 B2 | 4/2014 | Ahlgrim et al. |
| 9,456,688 B2 | 10/2016 | Moyer |
| 9,638,226 B2 | 5/2017 | Takahashi et al. |
| 2008/0129160 A1 | 6/2008 | Fleckenstein |
| 2009/0021122 A1 | 1/2009 | Green |
| 2009/0232588 A1 | 9/2009 | Goh |
| 2010/0090567 A1 | 4/2010 | Felice |
| 2010/0176697 A1 | 7/2010 | Fuerstenau |
| 2015/0060321 A1 | 3/2015 | Wang |
| 2016/0095430 A1 * | 4/2016 | Moyer .............. A47B 47/0091 211/188 |

FOREIGN PATENT DOCUMENTS

| | | |
|---|---|---|
| GB | 2176995 A | 1/1987 |
| WO | WO-2020077386 A1 * | 4/2020 |

* cited by examiner

MODULAR STORAGE AND WORK STATION

BACKGROUND OF THE INVENTION

1. Field of the Invention

This invention relates generally to a shelving storage system and, more specifically, to an improved arrangement of modular elements for stacking or combining shelving modules in a variety of desired configurations to provide modular storage and working spaces that can be easily and efficiently reconfigured, the improvement arising in the method of connecting the modules in the system.

2. Background Art

Various types of modular storage systems and arrangements have been disclosed or are commercially available that have been disclosed or are commercially available. Freestanding modular storage systems generally use some sort of corner locking mechanisms to maintain each shelf in place. These corner locking mechanisms, however, tend to be somewhat complicated such that the shelves may not be easily reconfigured. For example, U.S. Pat. Nos. 8,573,716 and 8,708,433 each include corner tongue and groove connections that overly complicate the connection and disconnection process, and because of the construction materials and design, are considered unable to withstand continuous and frequent use in rough environments.

None of the heretofore known structures and methods teach the inventive easy to use, easy to connect and disconnect, robust, simple, yet elegant, easily reconfigured construction which can provide for a large number of configurations of varying heights, shapes, surfaces and design appearance.

Commonly invented and owned U.S. Pat. No. 9,456,688, incorporated by reference as if fully disclosed herein, discloses a unique connection system that includes tubular, modular structures connected by double headed dowels that fit within the tubular structures and connect adjoining modules to each other. The connection system described and claimed in commonly-owned U.S. Pat. No. 9,456,688 work adequately to provide a modular storage and work surface station and a method and system for modular assembly of different sized and configured modules that are robustly retained and connected to each other while retaining an ability to reconfigure the shelving structure and thereby to reusably provide a configuration desirable to the user. However, an improved and simpler method of connecting adjoining modules to each other that enjoys all the benefits of the shelving system of U.S. Pat. No. 9,456,688 This improved structure is disclosed and claimed herein so as to provide several additional benefits, including easier assembly, permitting assembly by one person working alone, and which is more robust and can provide for additional and varied shelf orientations and configurations. Moreover, the elimination of separate connecting members, such as the double headed dowels of U.S. Pat. No. 9,456,688, reduces the number of interchangeable parts used in the corner connections to thereby simplify the assembly process and reduce costs in manufacture of several separate parts.

SUMMARY OF THE INVENTION

Accordingly, there is provided herein a modular storage system comprising a plurality of modular shelving units each comprising opposing lateral sides providing for a horizontally oriented length therebetween, the modular shelving units each extending between plural elongate vertically extending supports, the plural hollow elongate support members having longitudinal ends, each of the longitudinal ends including hollow apertures defined by an outer rim disposed thereat, each of the longitudinal end apertures further comprising an internal space extending into the elongate supports, the outer rim of each elongate end having at least three indentation cutouts, each cutout being shaped, dimensioned and oriented for receiving an extended tab, a predetermined number of the plural elongate support members being oriented vertically to define a storage module unit; a plurality of connection members, each connection member being shaped, dimensioned and configured for at least partial insertion into the longitudinal end aperture of at least one vertically oriented elongate support member and each said connection member including a securing member to secure an upper vertical connection member to an adjoining vertical connection member of an adjoining modular storage unit and at least one lateral extended securing tab member projecting from a proximal end of each connection member for engaging an indentation cutout in an end of a hollow elongate support of a horizontally adjoining shelving module for securing the two adjacent supports of the horizontally adjoining shelving module to each other thereby inhibiting horizontal motion therebetween.

In another aspect of the invention, the modular construction provides for a method of assembly and disassembly that is unique, easy and can be performed by a single user with a minimum of tooling.

In another aspect of the invention, a rotatable and orthogonally orientable shelving module connection provides a unique and robust connector for connecting discrete horizontally and vertically adjacent shelving module units to each other, each modular shelving unit including hollow vertically aligned elongate supports, the connection member being shaped, dimensioned and configured for maintaining the orientation and configuration of separate adjacent shelving module units so that adjacent support members retain vertical and horizontal engagement and alignment; each said connection member comprising first and second inserts disposed adjacent each other, the first insert capable of being inserted into the hollow elongate support of a first shelving module and having a tab member projecting from a proximal end of the insert for engaging a cutout in an end of a hollow elongate support of a second shelving module disposed horizontally adjacent the first hollow elongate support for securing the two adjacent supports of the first and second shelving modules to each other thereby inhibiting horizontal motion of the first shelving module relative to the second shelving module, and each insert having a proximal surface and further comprising a central aperture in the proximal surface and the central aperture being of the first insert being capable of alignment with a like central aperture of the second insert adjoining thereto, and a connection pin engaging each said central aperture of adjoining first and second inserts, the connection pin securing the adjoining first and second inserts to each other by transposing one of the inserts relative to the other in their orthogonal orientation while maintaining the connection therebetween in a desired configuration, whereby connection of the first and second inserts to each other defines a shelving module connection member.

The present application thus provides a modular storage and work surface station and a method and system for modular assembly of different sized shelving module units that are robustly retained and connected to each other and capable of being configured in a variety of desired configurations. The modular storage and work surface station may include a number of support members and shelves. The module units have interlocking corners and plural support and connection members providing for modular construction and ease in reconfiguration of storage modules and work surfaces as desired.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

Figure 1:
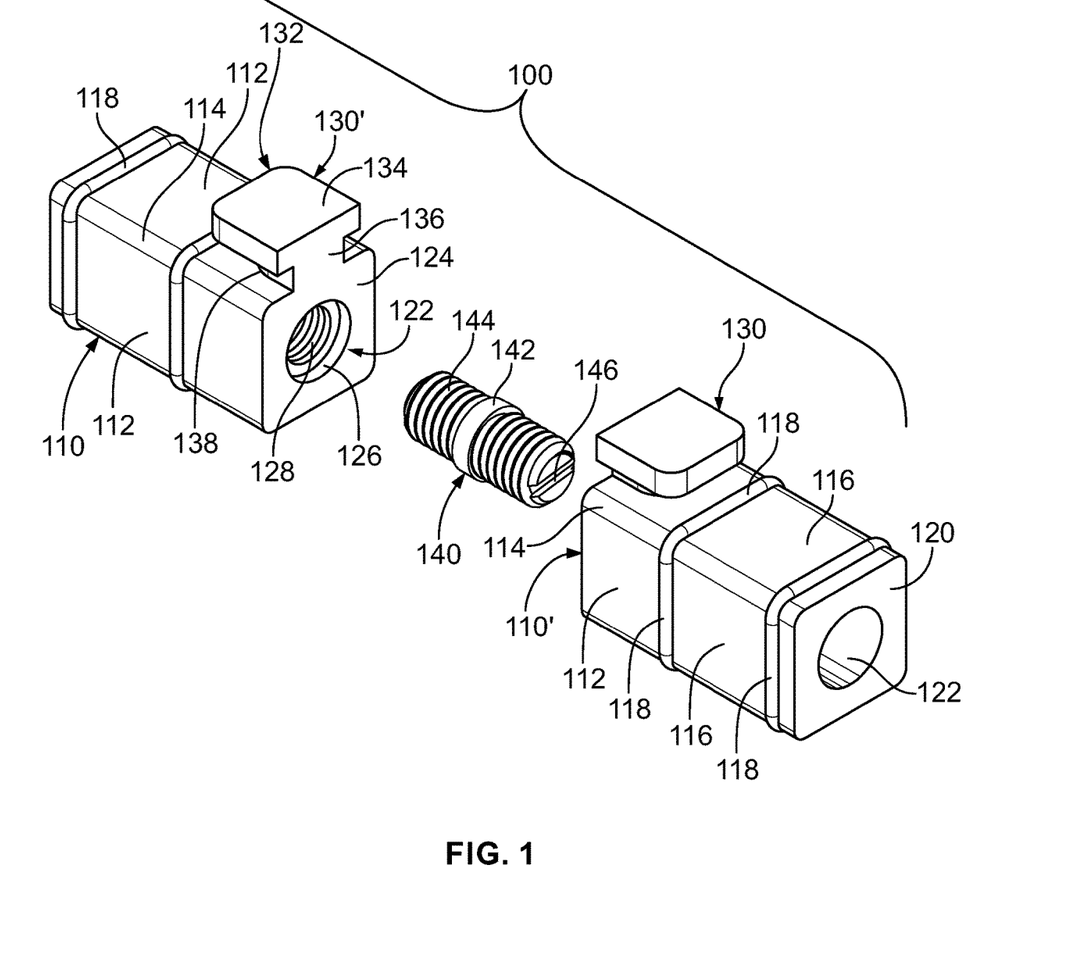
FIG. 1 illustrates in an exploded view a first embodiment of the invention showing a connector.

Referring now to FIG. 1, a first embodiment of the inventive orientable connector 100 is shown with three separate parts. As can be seen, the two end inserts 110, 110' are identical and are shown rotated 180 to present an essentially mirror image of each other. This is a distinct feature of and significant improvement as the inventive connector can be manufactured and assembled using fewer different parts and less time and effort are needed in assembly and connection of the shelving modules 210 (see FIG. 5, FIG. 7B) as will be explained below.

Figure 2:
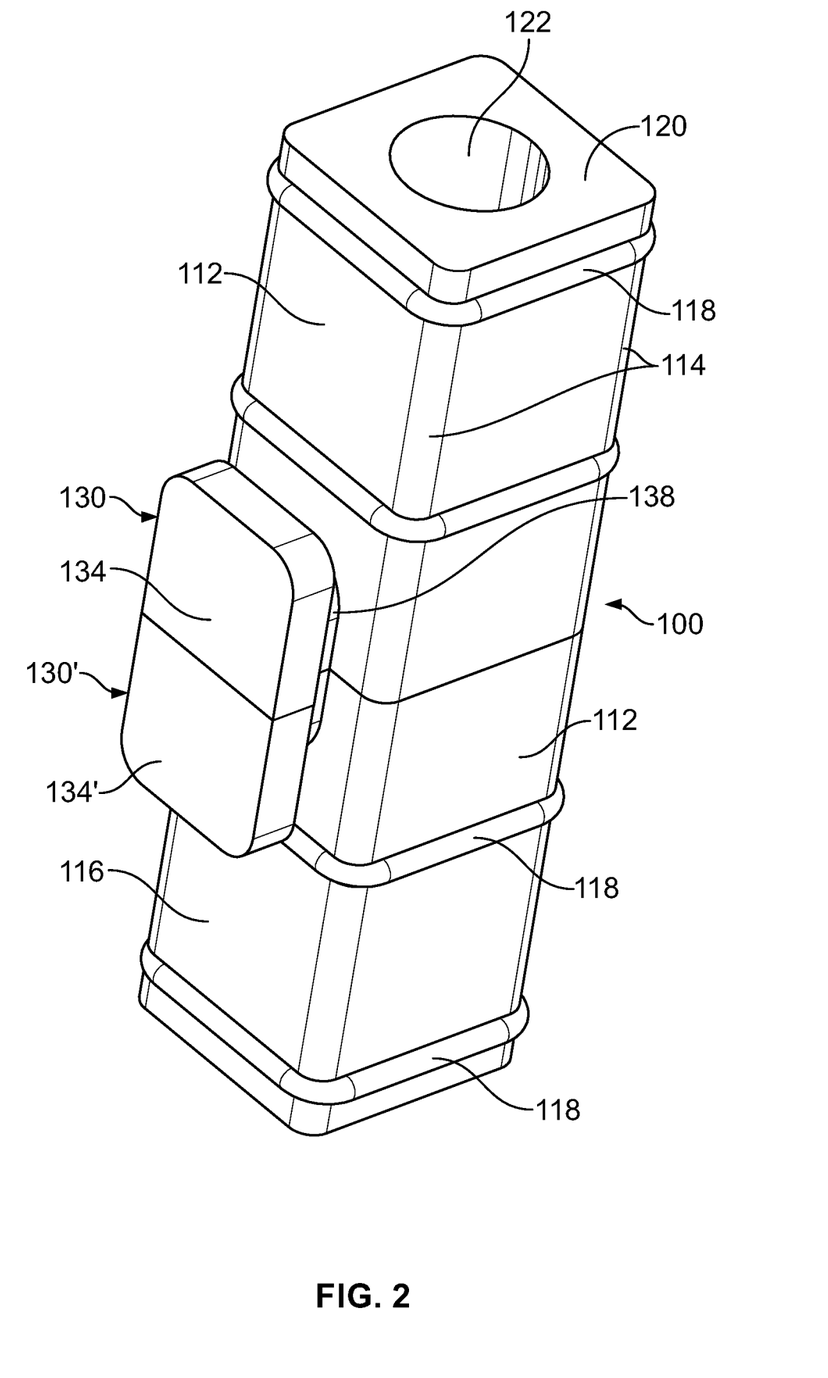
FIG. 2 illustrates in a perspective view the first embodiment of the invention as shown in FIG. 1 with the connector being connected in an inline shelf configuration.
Figure 3:
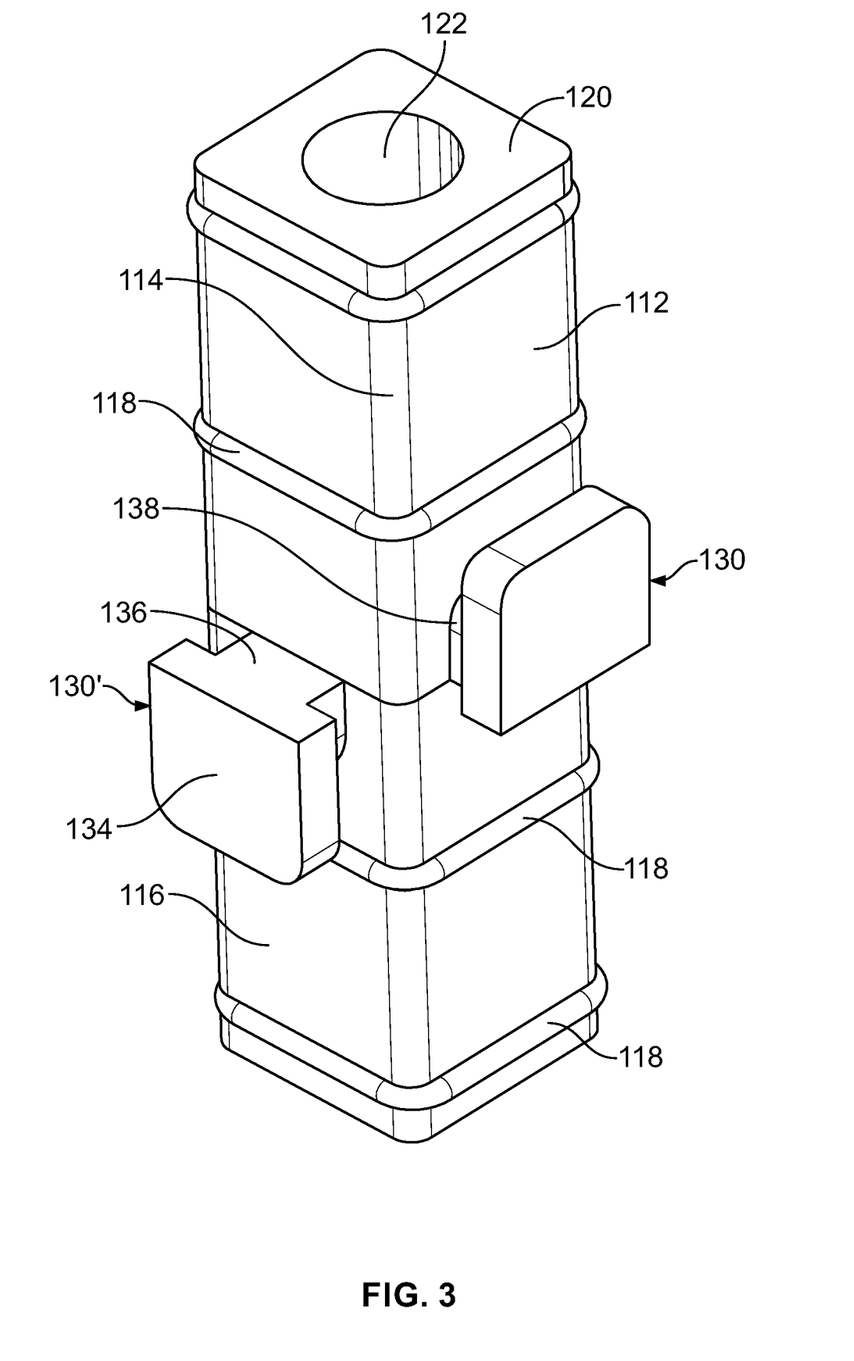
FIG. 3 illustrates in a perspective view of the first embodiment of the invention as shown in FIG. 1 with the connector being connected in for a second alternate configuration for connecting perpendicularly oriented shelf configurations.

Each of the two inserts 110 making up the connector 100 comprise a main insert body 112 and a tab portion 130. For clarity and efficiency, the description of the inserts 110, 110' will only be discussed with respect to the one insert 110, with the understanding that the other insert 110' has the identical features and structure. The exploded view of FIG. 1 shows the two inserts 110, 110' as being disconnected. A significant feature of this invention is the capability of connecting the inserts 110, 110' to each other in various configurations by a double as shown in FIGS. 2 and 3, described below.

Insert 110 comprises the main body 112 which is shown in a rectangular configuration, having rounded edges 114, but other configurations are also possible, for example a circular, octagonal or oval configuration. A significant feature of the inserts 110, 110' is their outermost dimension. This must be of a specified dimension to enable insertion into the tubular openings of the ends 218 of the posts 214 of each module (FIG. 4), and to provide an interference fit of the inserts within the tubular ends. To assist in providing such an interference fit, each insert body 112 includes one or more ridges, two ridges 118 being shown on the outer surface of side walls 116 of the insert body 112. As shown, the ridges 118 provide slight indentations extending from the side walls 116, the function of which is to increase the friction between the inserts 112 and the inner walls of the tubular posts into which the inserts are inserted so as to provide a sufficient interference fit that vertically adjacent modules are robustly connected to each other, as will be discussed below. The rounded corners 114 further assist in the insertion of the inserts 110, 110' into the tubular ends of the posts, in that the rounded corners avoid binding in the tight spaces which are found at the ends of the posts.

The inserts 110, 110' further include end walls, a first distal end wall 120 which will provide the connection locus or joint surface where the two inserts are joined and a second proximate end wall 124 disposed away from the connection locus. The two end walls 120, 124 preferably define the longitudinal extent of the side walls 116. A throughhole 122 preferably extends from the first end wall 124 to the second end wall 120. Adjacent the surface of first end wall 124 an annular countersink 126 is provided for permitting adjustments to the position and orientation of the inserts 110, 110' as they are being connected. The countersink 126 is preferably a square countersink to accommodate the ferrule 142 of the double threaded screw 140 as will be described below. Throughhole 122 is threaded with appropriate threads 138 at least adjacent the surface 124 to enable it to engage and retain corresponding threads 144 of the double headed screw 140. At each end of the double threaded screw 140 is disposed a slot 146 which is accessible by means of the throughhole 122 to a screwdriver (not shown) once the two inserts 110, 110' are connected to each other.

Figure 5:
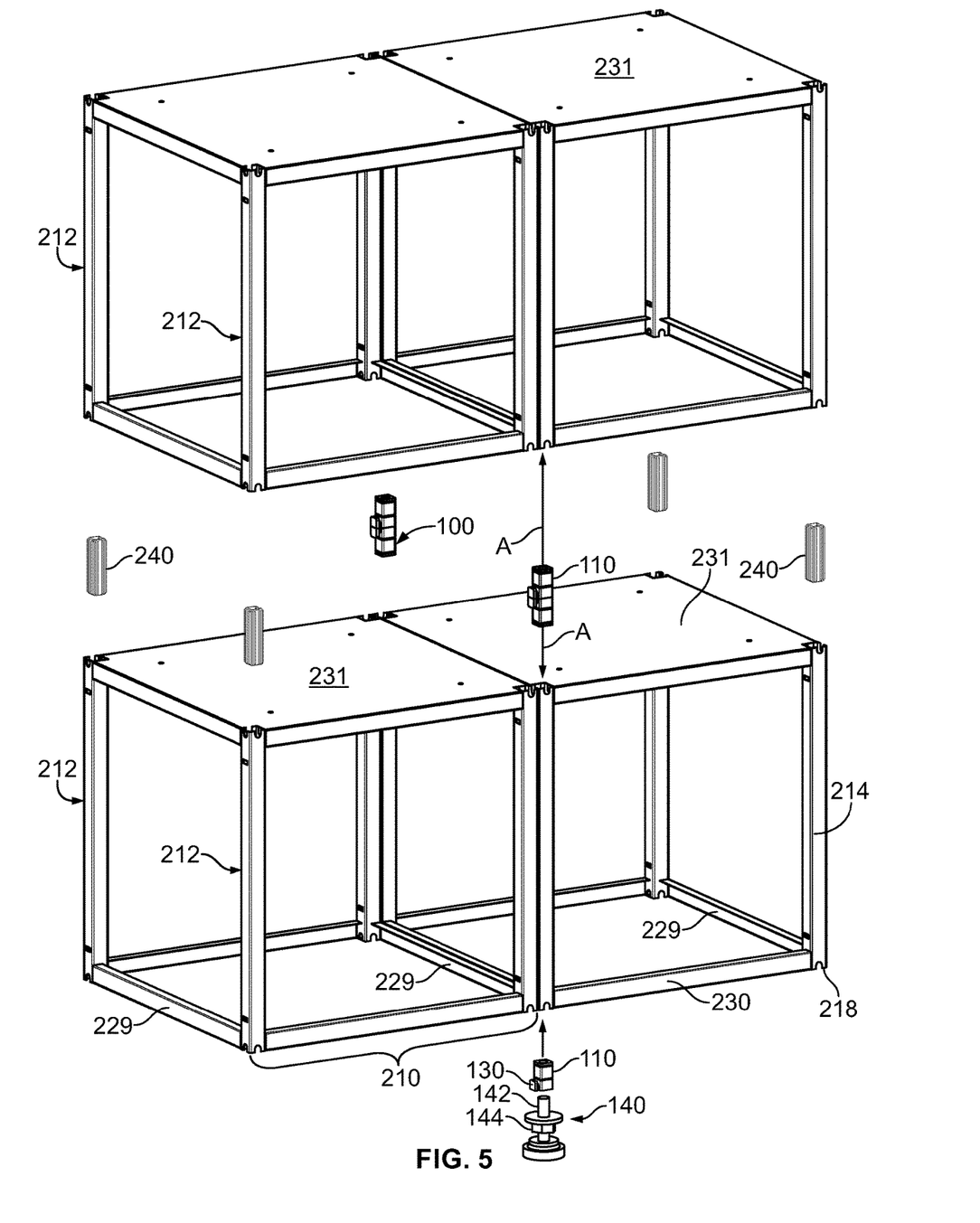
FIG. 5 is a detail perspective exploded view of the inventive shelf configuration including two horizontally connected shelf modules and two separate vertically aligned shelf modules to be connected thereto showing the inventive connector inserts and other elements for connecting therebetween.

Referring again to the inserts 110, 110', the insert body 112 further includes a tab portion which is shaped, dimensioned and oriented to engage a rounded recess in the tubular openings of the ends of the posts of an adjacent module (as will be described in reference to FIG. 5). The tab portion is comprised of a tab head 132 having an outer surface 134 that is preferably parallel to the surface 112 of the main insert body 110 to which it is attached. Preferably the attachment is an integral attachment via a neck portion 136 which is significantly smaller than the lateral width of the tab head surface 134, to enable it to engage and retain a post end of an adjacent module. The neck portion 136 incudes a rounded surface 138 which is capable of insertion into the corresponding rounded recess of an end 218 of a post 214 (FIG. 5).

Referring now to FIGS. 2 and 3, the inserts 110, 110' are shown connected to each other. FIG. 2 shows the inserts with a configuration in which the tabs 140 are in line and the surfaces 124 abut each other. This is essentially the same configuration that is used in commonly owned U.S. Pat. No. 9,456,688 for connecting adjacent modules when they are in line, except the mechanism that is being used here is more elegant, is easier to use, can be installed by a single installer, has fewer and interchangeable parts and provides a more robust connection that does not easily distrain without manual disassembly. FIG. 3 shows an alternative configuration which is oriented to connect two modules to each other in non-linear or perpendicular orientations, as will be described below.

To connect the two inserts 110, 110' to each other in preparation for the insertion into a post end, a double threaded screw 140 is show in line with the two threaded portions 128 of throughholes 122. Double threaded screw 140 includes screw threads 144 at each longitudinal end which are separated by ferrule 142. The dimensions of ferrule 142 are predetermined to provide ingress into the countersink 126 in each throughhole 122, 122' adjacent the surfaces 124, 124'. The internal screwthreads 128 of the throughholes 122 and the external screwthreads 144 are all oriented in the same angle and direction. One preferred method of connection is to screw the double threaded screw 140 into throughhole 122 until the ferrule 142 engages the countersink 126 and cannot be screwed in any further. Then the other insert 110' is positioned to enable the screwthread 128' to be screwed onto the other end of the double threaded screw 140 until the surfaces 124, 124' abut each other. This may not result in a position in which the orientation is for a particular use. In this case, the double threaded screw portion is adjusted to change the engagement point of the ferrule 142 within the two countersinks, 126, 126' until the desired configuration is obtained. The adjustment may be made after the desired orientation is achieved, that is, the surfaces 124, 124' are close to each other and then one of the double threaded screw ends is engaged at a screwdriver slot 146 by inserting a screwdriver into the throughhole 122 or 122'. The double threaded screw 140 is rotated until the ferrule 142 engages the wall of the countersink 126 or 126, locking the relative orientation of the two inserts 110, 110' into the desired configuration.

Referring now to FIGS. 2 and 3, the two desired configurations of the inserts 110, 110' are shown. As will be explained below, the configuration deployed, whether the one in FIG. 2 or the one in FIG. 3, will depend on the desired configuration of the modules as shown in FIGS. 5, 6, 7A and 7B. While the two inserts 110, 110' are identical in both views in FIGS. 2 and 3, the difference is in the relative orientation of the tab portions 130, 130'. The orientation shown in FIG. 2 is ideal for use in configurations as shown in the linear or straight configuration of FIG. 5, and in ones similar to the configurations shown in the aforementioned commonly-owned U.S. Pat. No. 9,456,688. For a perpendicular configuration, as shown in FIG. 7B, the orientation shown in FIG. 3 is used so that the connector is capable of connecting adjoining modules which are not configured in a linear or straight direction, but are staggered or are configured perpendicularly to each other.

Figure 4:
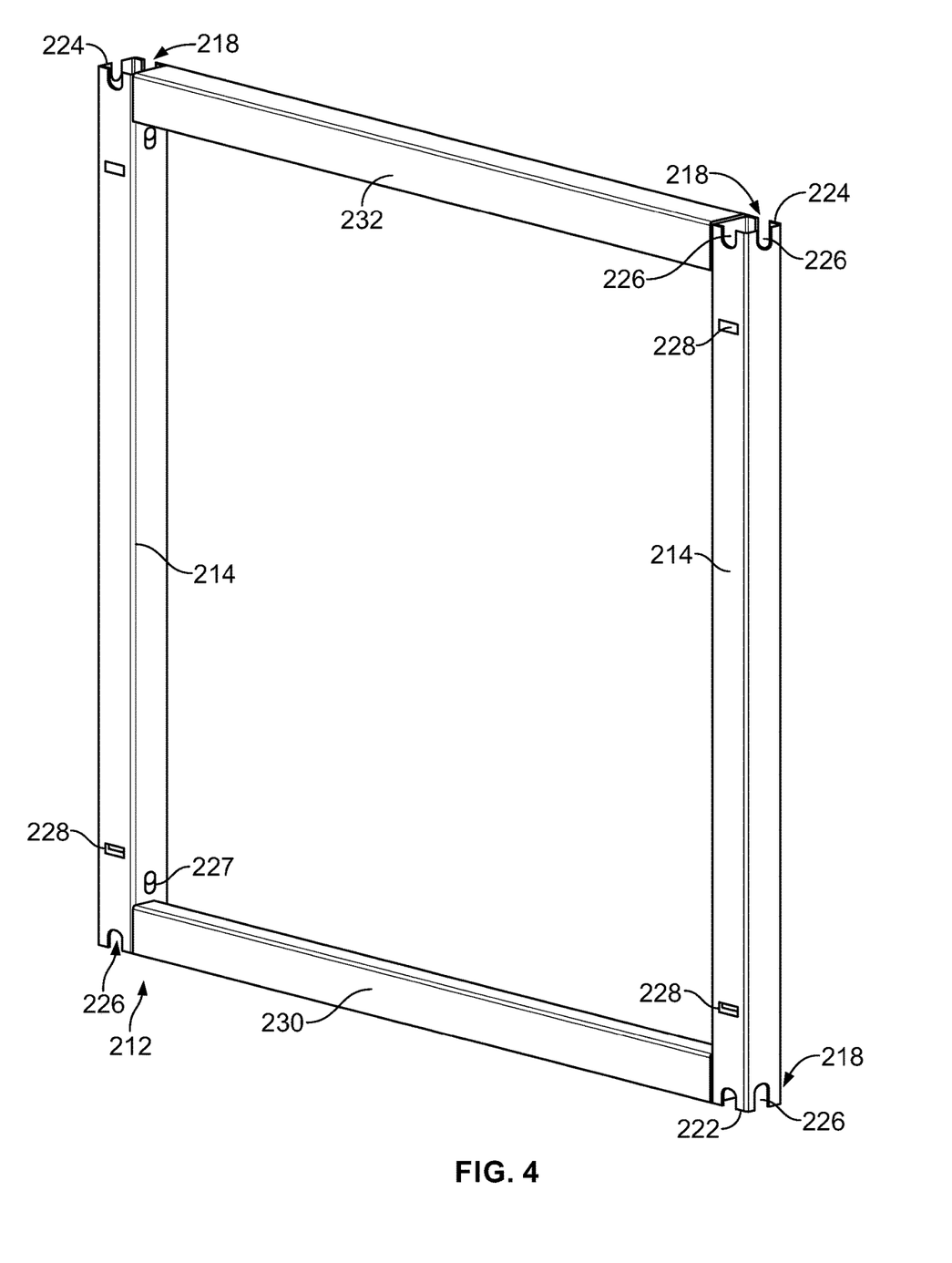
FIG. 4 illustrates in a perspective view tubular vertical posts connected to each other by cross-bars in a square configuration showing in detail the slotted or cutout ends of the corners.

Referring now to FIG. 4, a partial frame member 212 of a module 210 (FIG. 5) is shown. The frame member 212 comprises two hollow elongate support members, comprising vertical posts 216 having longitudinal ends 218, and two cross-bars, a lower crossbar 230 and an upper cross-bar 232. The ends 218 of the posts 216 which is uppermost when the modules 12 are deployed on a floor is open. Similarly, although not shown, the opposite end 218 is also open. These open ends 218 are each able to receive within the tubular enclosures one of a number of inserts which will be discussed below in greater detail.

The two vertical posts 216 comprise tubular structures, made of a suitable metal, such as steel or stainless steel, that define the shape of the frame member and ultimately, of the four vertical corners of the cube of the module. As shown in FIG. 4, the open ends 218 have outer rims 222 in the general shape of a square on one side to which the cross-bars 230 are attached. The two vertical posts 216 longitudinal ends 218 are open at both ends, and each of the ends 218 terminate at the outer rim 222. Three of the edges 224 of the rim 222 have a cutout 226 (similar to the corresponding cutouts 26 of the aforementioned commonly-owned U.S. Pat. No. 9,456,688) except instead of having two opposed cutouts, three cutouts are provided at each rim. The reason for this is to add flexibility in the orientation of the modules relative to each other depending on the configuration desired.

Vertical posts 216 are attached by the crossbars 230 adjacent the longitudinal ends 218, the ends of the cross-bars 230 being connected by an appropriate means, such as spot welding, to the one edge 224 of the rim 222 lacking a cutout. This will leave the other three edges 224 having a cutout 226 free to accept the neck 136 of the tab 130, 130' when an insert 110, 110' (FIG. 2 or 3) is disposed within the open aperture at the longitudinal ends 218 of the vertical posts 214. The top cross-bar 232 may include a suitable attachment point for shelf surface (not shown in FIG. 4), similar to shelf surface 14 of the devices in aforementioned commonly-owned U.S. Pat. No. 9,456,688. Optionally, lateral perforations 228 having a bent-in edge may also be used to provide as top for the inserts 110, 110' so that the inserts 110, 110' do not exceed the dimensions which are allotted for them to be inserted and still provide their connecting function (see, for example, elements 34 shown in FIG. 15A of U.S. Pat. No. 9,456,688). One additional and optional feature is an aperture 227 disposed on the inner sides of the posts 214 that provide access to a connector, such as screws (not shown) to secure the vertical position of the inserts 110, 110'.

Referring now to FIG. 5, two lower modules 210 are shown being connected to each other horizontally by means of one of the inserts 110 being inserted into the lower end of a hollow post 214 with the orientation of the tab 130 so that it extends into the hollow post 214 of the adjoining module. Since the cutouts 226 of the two adjoining posts 214 are shaped, oriented and dimensioned to accept the neck 136 of the tab 130 (FIG. 1), across both edges 222 so that the tab 130 engages the adjoining post 214 to maintain the connection. While FIG. 5 show only a single insert 110, a second insert (not shown for drawing clarity) may be inserted in the rear post for a more sturdy and robust connection. The aperture 126 in insert 130 inserted in the post 214 of the lower module can accept a spindle 142 of a vertically adjustable caster 140, the vertical adjustment being enabled by a screw setting of a nut 144. Alternatively, the spindle 142 may be threaded (not shown) and depending on the adjustment desired, can set the height of the caster to provide for an appropriate levelling function.

As shown in FIG. 5, two frame members 212, comprising for each module 210 front rear frame members 212, connected to each other by an L-shaped connecting bar 229. Alternatives to this connection come readily to mind of a person having ordinary skill, such as a hollow tube as in the posts 214, or even a solid metal or other material connector. A connection can be made by suitable means, such as spot welding or using a suitable connector, as will be determined to be the most efficient manufacturing method. Also, while the connections are shown to be at the ends 218 of the posts 214, the connections of the cross-bars 229 to the frame members 212 can be at any suitable point along the longitudinal extent of the posts 214 commensurate with maintaining a sturdy and robust connection. To provide a shelf for storing items, a shelf surface 231, made of, for example, sheet metal, extends between the frame members 212 at the upper end of the posts 214 also providing a connection of the front and rear frame members at their upper ends. The sheet metal surfaces are omitted for the bottom two modules for easier illustration.

When the connections between the lower two modules 210 are complete, the connection between the lower and upper pair of modules 210 can be made. This is done by joining two inserts 110, 110' in the in-line configuration, shown in FIG. 2, to create the inventive connector 100. These are inserted into the appropriate posts 214 one insert 110 being inserted into the lower post 214 and the other insert 110' into the upper post end 218, as shown by arrows A. As the insertion of the bottom insert 110' occurs into the end 218 of the hollow tube of post 214, care is taken to ensure that the tab 130 engages the post 214 of the adjoining module 210 so as to robustly complete the horizontal connection between the modules 210. As shown in FIG. 5, the opposed ends, disposed distally from the connection point between the two modules, may include their own connectors 100 (not shown) or alternatively, may provide for straight metal secondary connectors 240 shaped and dimensioned to be inserted into the ends 218 of the outer posts 214. To retain the secondary connectors 240 in place so that they do not slip completely into the hollow tube of posts 214, the lateral perforations 228 having a bent in edge inhibit further insertion due to gravity by proving a stop, similar to that described and shown in aforementioned U.S. Pat. No. 9,456,688.

The secondary connectors 240 are also inserted into the corresponding tubular opening at end 218 of an upper module 210 to make the vertical connection complementary to the vertical connection that is made by the connectors 100. That is, the upper modules are placed over the lower pair of modules, as shown, and when properly lined up, the lower ends 218 of the upper module posts 214 the insertion of the upper insert 110 into the tubular end occurs simultaneously with the insertion of the secondary connectors 240 into the respective distally disposed posts 214. The tab 130' is oriented in the in-line direction (FIG. 2) to ensure that the tab 130' engages the adjacent post 214 of the adjoining upper module 210 to retain the horizontal connection of the two upper modules. As mentioned with reference to the single insert 110 that goes into the foot of the lower module pair post 214, care is taken to ensure that the tab 130' engages the post 214 of the adjoining upper module 210 so as to robustly complete the horizontal connection between the modules 210. Thus, the inventive connector 100 provides the function of maintaining the both vertical and horizontal connections of adjacent modules.

The caster 140 is, as in the original invention described and claimed in aforementioned U.S. Pat. No. 9,456,688, fits within the lower end of the posts 214, and includes screw adjustments, by means of threaded spindle 142 and nut 144, to provide a leveling function to the posts 214 to accommodate uneven floors or unforeseen aberrations in the structure of the modular system embodiments illustrated and described herein.

Figure 6:
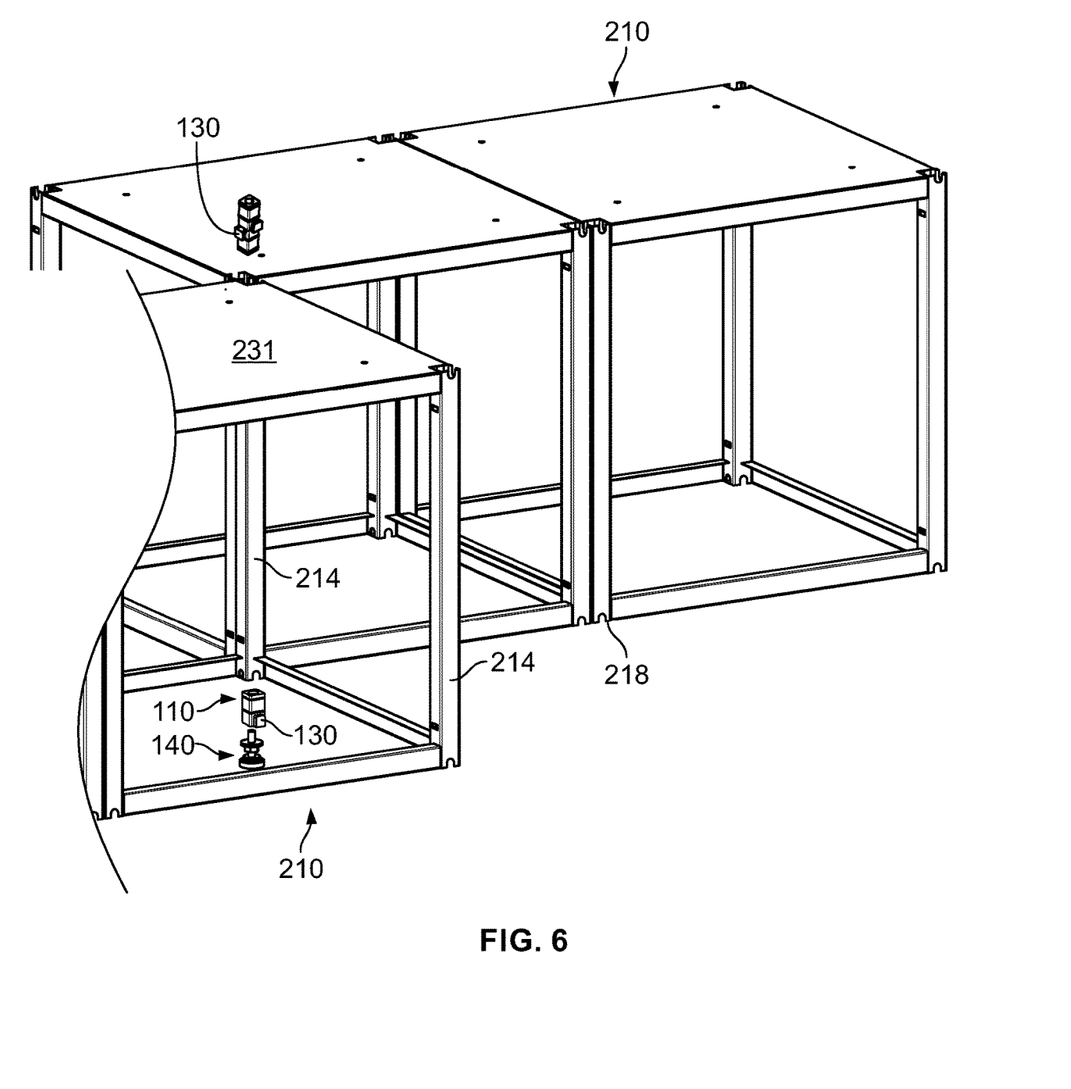
FIG. 6 is a detail cutaway perspective view of a first embodiment of the inventive shelf configuration including two horizontally connected shelf modules and a separate offset shelf module to be connected thereto showing the inventive connector inserts in a perpendicular orientation for connecting therebetween.

Referring now to FIG. 6, a staggered module configuration is illustrated where the end of a pair of linearly connected modules, such as the lower pair of modules of FIG. 5, are connected at the distally disposed post 214 of one of the modules 210. That is, the adjoining posts 214 from two staggered modules 210 are not in-line and only one of the posts 214 from each module is attached to another corresponding post 214 of the other module 210. Additionally, as shown in FIG. 6, a footing, in the nature of a caster 140 and insert 110, is shown disposed in one of the posts 214 as exemplary, with the understating the each of the lower ends 218 of several additional posts 214 will receive a similar insert 110/caster 140 combination. However, with the insert 110 shown in FIG. 6, care must be taken to ensure the tab 130 engages the post 214 of the adjacent module 210 to provide the connection therebetween.

Figure 7A:
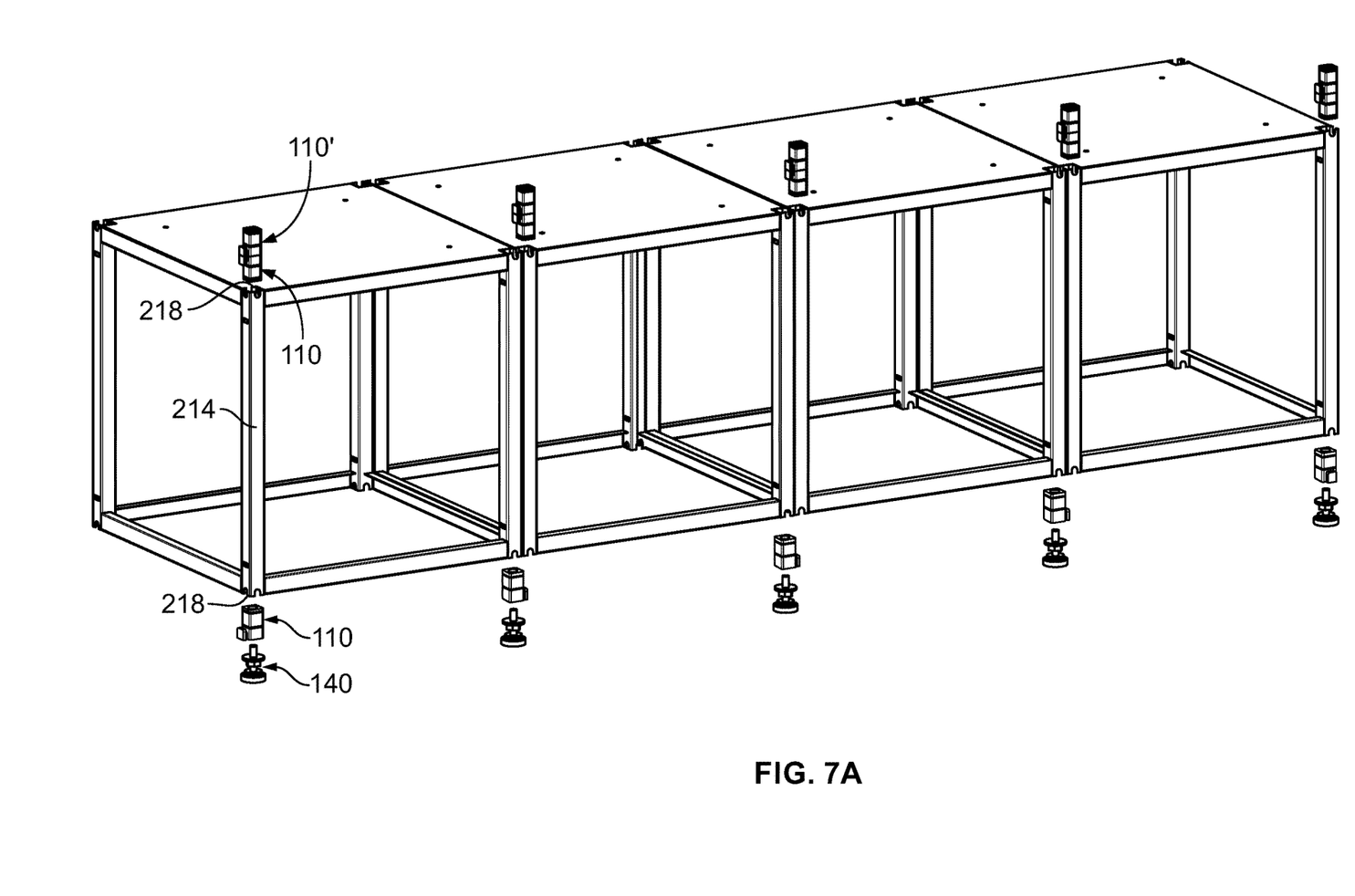
FIG. 7A is a perspective view of a second embodiment of the inventive shelf configuration including several horizontally connected shelf modules showing the inventive connector inserts in an in-line orientation for connecting therebetween.
Figure 7B:
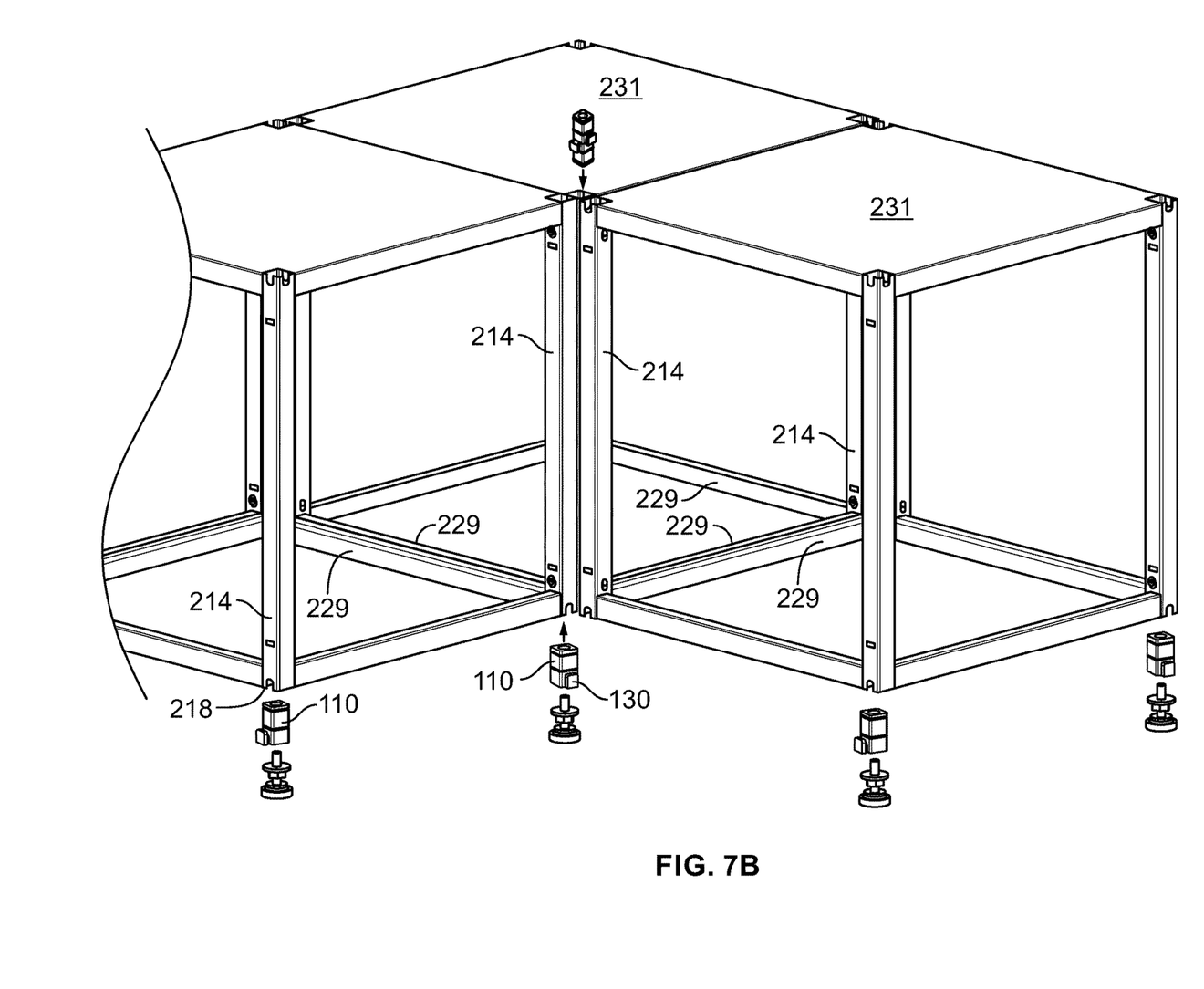
FIG. 7B is a perspective view of a third embodiment of the inventive shelf configuration including two horizontally connected shelf modules and a separate perpendicularly extending shelf module to be connected thereto showing the inventive connector inserts in a perpendicular orientation for connecting therebetween.

A different configuration of modules 210 is show in in FIGS. 7A and 7B, which provides for different module orientations with up to 4 modules connected end to end or perpendicularly. Shown in FIG. 7A is a straight in-line configuration similar to those shown and described in aforementioned U.S. Pat. No. 9,456,688, with the significant difference that inserts 110 and 110' are used for connecting the top and bottom ends 218 of modules 210. While inventive inserts 110 are preferred in order to reduce the number of interchangeable parts used in the connector system, it should be appreciated that the footings may take other forms when no adjacent connection is required, e.g., the insert/caster combination shown in aforementioned U.S. Pat. No. 9,456,688, items 70 and 80 of FIGS. 8-10. Other types of similar caser insert/caster connections will come readily to mind to a person having ordinary skill.

Referring now to FIG. 7B, wherein a perpendicular module orientation is shown, care must be taken to ensure to ensure appropriate connections are made between three adjacent modules 210. That is, because three posts 214 will be adjoining each other at a certain point in the configuration, and secure connections must be made between all three. Placement and orientation of both connectors 100 inserted in the upper ends of posts 214 and footings 110/140 inserted in the lower ends 218 must be utilized to connect all of the modules 210 to each other. Pursuant to the invention, a connector 100 having a perpendicular orientation (FIG. 3) is inserted into the end 218 of the module 210 shown at the rear of the configuration, thereby connecting in line the two leftmost modules 210. To ensure connection of these connected modules to the perpendicularly extending module 210, an insert 110 is also inserted in the lower end 218 of the same post 214 but having tab 130 oriented outwardly toward the perpendicular module 210. In this way, engagement of the tab 130 with the corresponding adjacent post 214 of the perpendicular module 210 will connect the lower ends 218 of the posts 214. Additional connections can be made at the opposed frame members away from the three-post connection both at the upper and lower ends 218 that will enable the connections to remain secure and robust. In the event that additional modules 210 are disposed in a second row above ones shown (FIG. 5, and see also, e.g., FIGS. 12, 13 and 15 of U.S. Pat. No. 9,456,688), it is readily understood that the connections made both vertically and horizontally will support and strengthen the configuration orientation and integrity.

It will also be readily understood that the configurations shown in the drawing figures are exemplary only and do not limit the numerous and varied configurations that will arise to person of ordinary skill depending on the space available, the configuration desired and the imagination of the user. For example, as described above, but not shown in these drawing figures is the ability to construct a second or even third row of modules, above the ones shown, using the inventive connector 100. Such multiple level configurations are shown in FIG. 5 and in aforementioned U.S. Pat. No. 9,456,688, which has been incorporated by reference herein. All of the different features of that patent disclosure are also applicable herein, including the configurations of an elongated rectangular module being placed below two cubical modules, (see FIGS. 13 and 16). Of course, if the inserts 110' that will be needed for closing off he open end 218 of the post 214 should terminate at a level that is at or below the level of the shelf surface 231 so that placement of modules does not interfere with the level of continuity of the surfaces.

The invention herein has been described and illustrated with reference to the embodiments of FIGS. 1-7B, but it should be understood that the features and operation of the invention as described is susceptible to modification or alteration without departing significantly from the spirit of the invention as disclosed above. For example, the dimensions, size and shape of the various modules and elements may be altered to fit specific desired applications. Additionally, it should be appreciated that although some of the views in FIGS. 5-7B show surfaces 231, and some do not, the use of the surfaces for providing a shelving function is contemplated across all cross-bars 229, such surfaces not being shown in some views for ease in viewing and understating the connection structures.

Other configurations and alterations to the elements will readily come to mind of a knowledgeable user, being limited only by the user's imagination and the modular nature of the invention allowing the user to contemplate different configurations and uses of the inventive connector. For example, while the necks 136 of tabs 130 and the cutouts 226 at the ends 218 of each hollow elongate support 214 are shown to be semicircular, other shapes, for example triangular or square may be used. Accordingly, the specific embodiments illustrated and described herein are for illustrative purposes only and the invention described herein is not limited except by the following claims.

What is claimed is:

1. A rotatable and orthogonally orientable shelving module connection member for connecting horizontally and vertically adjacent shelving module units, each shelving unit including hollow vertically aligned elongate supports, the connection member being shaped, dimensioned and configured for maintaining the orientation and configuration of separate adjacent shelving module units so that adjacent support members retain vertical and horizontal engagement and alignment; each said connection member comprising:
   a) first and second inserts disposed adjacent each other, the first insert capable of being inserted into the hollow elongate support of a first shelving module and having a tab member projecting from a proximal end of the insert for engaging a cutout in an end of a hollow elongate support of a second shelving module disposed horizontally adjacent the first hollow elongate support for securing the two adjacent supports of the first and second shelving modules to each other thereby inhibiting horizontal motion of the first shelving module relative to the second shelving module, and each insert having a proximal surface and further comprising a central aperture in the proximal surface and the central aperture being of the first insert being capable of alignment with a like central aperture of the second insert adjoining thereto, and
   b) a connection pin engaging each said central aperture of adjoining first and second inserts, the connection pin securing the adjoining first and second inserts to each other by transposing one of the inserts relative to the other in their orthogonal orientation while maintaining the connection therebetween in a desired configuration, whereby connection of the first and second inserts to each other defines a shelving module connection member.

2. The rotatable and orthogonally orientable shelving module connection member according to claim 1, wherein the central aperture of each of the adjacent first and second inserts is threaded and the connection pin includes two opposed ends, the ends being double threaded, whereby screwing the connection pin into the central apertures of the first and second inserts until the orientation of the inserts results in a desired configuration.

3. The rotatable and orthogonally orientable shelving module connection member according to claim 2, wherein the first and second inserts are connected to each in an inline orientation wherein the tab members are immediately adjacent each other.

4. The rotatable and orthogonally orientable shelving module connection member according to claim 2, wherein the first and second inserts are connected to each in a perpendicular orientation wherein the tab members are oriented orthogonally 90 degrees to each other.

5. A rotatable and orthogonally orientable shelving module connection member for connecting horizontally and vertically adjacent shelving module units having vertically oriented hollow tubular channels defined by walls with a cutout disposed at least at one end of a channel wall, the connection member comprising:
   a) first and second inserts, each insert further comprising:
      i. an elongated body, shaped and configured to fit within the end of horizontally disposed elongated support member, being defined by a proximal surface at one end, a distal surface at the opposed end and at least one tab surface extending between the proximal and distal surface, and a central aperture extending from the proximal surface, at least part way into the body of the insert,
      ii. a tab being disposed adjacent to the proximal surface and extending parallel to the at least one tab surface along a portion of the elongated body, and
      iii. a neck portion connecting the tab to the elongated body, the neck portion further comprising a lateral dimension smaller than the lateral dimension of the tab such that at least a portion of the tab is cantilevered over the tab surface;
   b) a connection pin being shaped, dimensioned, oriented and configured for connecting the first insert to the second insert,
   wherein the connection pin is capable of engaging each said central aperture of adjoining first and second inserts when a connection is made, the connection pin securing the adjoining first and second inserts to each other by such that one of the inserts may be oriented relative to the other in their orthogonal orientation while maintaining the connection therebetween in a desired configuration, whereby connection of the first and second inserts to each other defines the shelving module connection member.

6. The rotatable and orthogonally orientable shelving module connection member according to claim 5 wherein the insert elongated body includes at least one ridge on the outer surface of the tab wall for providing an interference fit within the vertically oriented hollow tubular channels of the shelving units by enhancing interference friction between the at least one insert tab wall and the inner walls of the shelving unit hollow tubular channels into which the inserts are to be inserted.

7. The rotatable and orthogonally orientable shelving module connection member according to claim 5 wherein, in each insert, the lateral dimension of the neck portion attaching the tab to the elongated body is smaller than the lateral width of the tab thereby enabling attachment of an insert tab to engage the cutout of the tubular member to which it is to be inserted and also enabling engagement to a cutout in a wall of a hollow tubular channel of an adjacent module.

8. The rotatable and orthogonally orientable shelving module connection member according to claim 7 wherein the neck portion includes a rounded surface which is capable of insertion into the corresponding rounded cutouts of the hollow tubular channels.

9. The rotatable and orthogonally orientable shelving module connection member according to claim 7 wherein the walls of the hollow tubular channels of each have a predetermined thickness, and the space between the tab and the tab wall of the elongated insert is at least twice the predetermined channel wall thickness to enable the tab to engage the cutouts at each end of the channel wall so as retain in a connected interrelationship two adjacent hollow tubular channels of adjacent modules.

10. The rotatable and orthogonally orientable shelving module connection member according to claim 5 wherein the first and second inserts are capable of being rotated relative to each other to present an alternative configuration where the two inserts are oriented to each other in a non-linear orientation to connect modules that are not in linear orientation to each other.

\* \* \* \* \*